(12) United States Patent
Henry et al.

(10) Patent No.: US 10,701,582 B2
(45) Date of Patent: Jun. 30, 2020

(54) DYNAMIC APPLICATION QOS PROFILE PROVISIONING

(71) Applicant: Cisco Technology, Inc., San Jose, CA (US)

(72) Inventors: Jerome Henry, Pittsboro, NC (US); Sudhir Kumar Jain, Fremont, CA (US); Thomas Szigeti, Vancouver (CA); Jon Michael Snyder, Portland, OR (US); Gangadharan Byju Pulanikkal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 15/376,843

(22) Filed: Dec. 13, 2016

(65) Prior Publication Data
US 2017/0245170 A1    Aug. 24, 2017

Related U.S. Application Data

(60) Provisional application No. 62/299,359, filed on Feb. 24, 2016.

(51) Int. Cl.
*H04W 28/02* (2009.01)
*H04L 29/08* (2006.01)
(Continued)

(52) U.S. Cl.
CPC ..... *H04W 28/0268* (2013.01); *H04L 41/0806* (2013.01); *H04L 41/0893* (2013.01);
(Continued)

(58) Field of Classification Search
CPC .......... H04W 28/0268; H04L 41/0806; H04L 41/0893; H04L 47/2475; H04L 61/1511; H04L 67/306; H04L 67/322; H04L 61/103
(Continued)

(56) References Cited

U.S. PATENT DOCUMENTS

| 2011/0222520 | A1 | 9/2011 | Montemurro et al. |
| 2012/0317261 | A1* | 12/2012 | Ahmavaara ......... H04L 63/0815 709/223 |
| 2012/0324100 | A1* | 12/2012 | Tomici ................. H04L 45/123 709/224 |

(Continued)

OTHER PUBLICATIONS

Barbara Orlandi et al., "Wi-Fi Roaming—Building on ANDSF and Hotspot2.0", Alcatel-Lucent, 2012, 45 pgs.

*Primary Examiner* — Mark H Rinehart
*Assistant Examiner* — Kokou R Detse
(74) *Attorney, Agent, or Firm* — Merchant & Gould P.C.

(57) ABSTRACT

Dynamic application QoS profile provisioning may be provided. First, an access point may send a profile to a client device. The profile may comprise a plurality of application identifiers and a plurality policies corresponding to the plurality of application identifiers. Each of the plurality of application identifiers may respectively correspond to a plurality of applications. Next, the client device may receive the profile. Then the client device may select, from the received profile, a first policy from the plurality policies in the profile. The first policy may correspond to a first application identifier in the plurality of application identifiers. The first application identifier may correspond to a first application within the plurality of applications. The first application may be on the client device. The first application on the client device may then create a network flow from the client device to the access point based on the selected first policy.

20 Claims, 4 Drawing Sheets

(51) Int. Cl.
   *H04L 29/12*      (2006.01)
   *H04L 12/24*      (2006.01)
   *H04L 12/859*     (2013.01)

(52) U.S. Cl.
   CPC ...... *H04L 47/2475* (2013.01); *H04L 61/1511* (2013.01); *H04L 67/306* (2013.01); *H04L 67/322* (2013.01); *H04L 61/103* (2013.01)

(58) Field of Classification Search
   USPC .......................................................... 370/328
   See application file for complete search history.

(56) References Cited

U.S. PATENT DOCUMENTS

| | | | |
|---|---|---|---|
| 2014/0254502 A1 | 9/2014 | Cai et al. | |
| 2014/0280898 A1* | 9/2014 | Voit ..................... | H04W 4/029 709/224 |
| 2014/0341076 A1 | 11/2014 | Orlandi et al. | |
| 2015/0358483 A1* | 12/2015 | Jeong ................ | H04W 28/0289 370/328 |
| 2016/0112374 A1* | 4/2016 | Branca ................. | H04L 63/102 726/1 |
| 2016/0112896 A1* | 4/2016 | Karampatsis ..... | H04W 28/0252 370/230.1 |
| 2016/0277927 A1 | 9/2016 | Lee et al. | |

\* cited by examiner

DYNAMIC APPLICATION QOS PROFILE PROVISIONING

RELATED APPLICATION

Under provisions of 35 U.S.C. § 119(e), Applicants claim the benefit of U.S. Provisional Application No. 62/299,359, filed Feb. 24, 2016, which is incorporated herein by reference.

TECHNICAL FIELD

Embodiments presented in this disclosure generally relate to computer networks, and more specifically, to providing a quality of service policy to a wireless client of a protected network.

BACKGROUND

A computer network, in general, allows two or more devices interconnected by communication links and subnetworks to exchange information and/or share resources. The devices may serve as endpoint devices where data is typically originated or terminated in the computer network, or serve as intermediate devices where data is typically routed to other devices (e.g., other intermediate devices, endpoint devices, etc.) and/or subnetworks in the computer network. Examples of intermediate devices include routers, bridges and switches that interconnect communication links and subnetworks, whereas an endpoint device may be a computer located on one of the subnetworks.

Devices in the computer network (e.g., end station, intermediate stations, etc.), in general, communicate by exchanging discrete packets or frames of data according to predefined protocols. In this context, a protocol represents a set of rules defining how the stations interact with each other to transfer data. The traffic flowing into a network device— e.g., a router, switch, bridge, server, and the like—is generally made up of multiple abstraction layers (e.g., the Open Systems Interconnection (OSI) model). Each of these logical layers generally relates to communications functions of a similar nature. Generally, each layer is responsible for providing some service to the layer above it, and similarly each layer may use services of the layer below it.

The International Standards Organization (ISO) defined seven layers as a standard for computer networks in creating the OSI model. The layers are defined as follows: (1) the physical layer, (2) the data link layer, (3) the network layer, (4) the transport layer, (5) the session layer, (6) the presentation layer, and (7) the application layer. Generally, the physical layer is responsible for transmitting unstructured bits of information across a link. The data link layer generally provides error-free transfer of data frames over the physical layer, allowing layers above it to assume virtually error-free transmission over the link. The network layer is responsible for ensuring that any pair of systems in the network can communicate with each other, while the transport layer establishes a reliable communications stream between a pair of systems. The session layer generally facilitates the establishment of sessions between processes running on different sessions, by providing functionality for session establishment, maintenance and termination, as well as session support functionality such as security, name recognition services, and so on. Additionally, the presentation layer is responsible for the delivery and formatting of application layer information, while the application layer is responsible with the transfer and manipulating application data (e.g., transferring files, mail services, and so on).

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
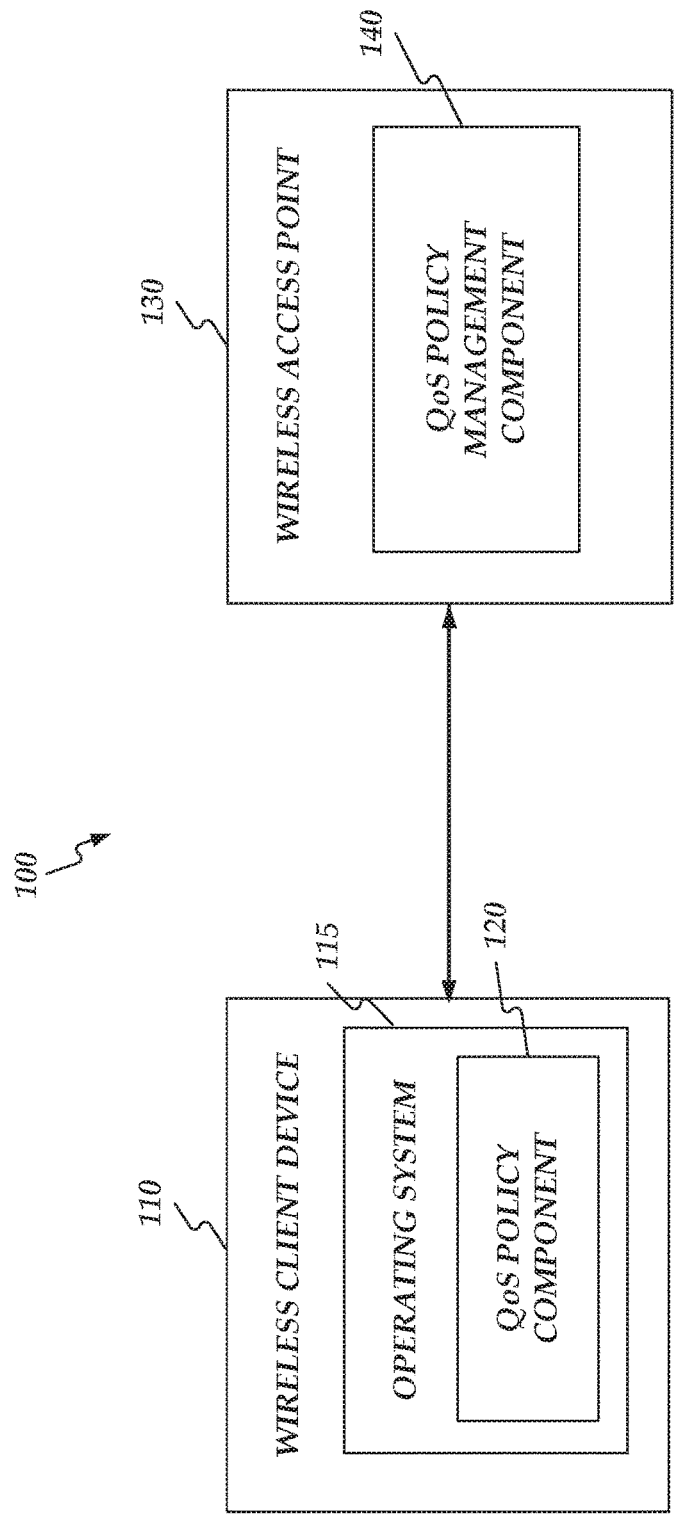
FIG. 1 shows an operating environment.

Dynamic application QoS profile provisioning may be provided. First, an access point may send a profile to a client device. The profile may comprise a plurality of application identifiers and a plurality policies corresponding to the plurality of application identifiers. Each of the plurality of application identifiers may respectively correspond to a plurality of applications. Next, the client device may receive the profile. Then the client device may select, from the received profile, a first policy from the plurality policies in the profile. The first policy may correspond to a first application identifier in the plurality of application identifiers. The first application identifier may correspond to a first application within the plurality of applications. The first application may be on the client device. The first application on the client device may then create a network flow from the client device to the access point based on the selected first policy.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A network device (e.g., a network switch) may comprise a computer device that may connect network segments. A network device may operate at one or more layers including, for example, the physical layer, the data link layer, the network layer, and/or the transport layer. While four layers may be described, a switch may operate at all seven layers of the OSI stack. For instance, a network device may inspect data packets as they are received. In doing so, the network device may determine the source and destination of a packet and forward it accordingly. Additionally, a network device may contain some intelligence beyond examine and forward logic. This intelligence may facilitate having a network device perform some management functions. For example, a network device may selectively turn some port range on or off, may selectively establish and/or maintain priority settings for ports, may perform media access control (MAC) filtering to prevent MAC flooding, may use a spanning tree protocol, may perform link aggregation, and so on. When these management functions are performed, they may be performed in actual (e.g., physical) network devices.

Traffic flowing through a communications network may be viewed as a set of independent flows (also referred to herein as "network connections"). For instance, a flow may comprise a set of data packets that may require similar treatment by the network. Flows may be defined according to a wide range of criteria to meet different needs. For instance, a flow may be the set of packets sent from one host to another or the set of packets exchanged by a pair of communicating application programs. For example, a flow may represent the network traffic flowing between a game client and a game server. As another example, a flow may represent the network traffic flowing between a streaming content server and a client. There may be many flows passing through any point in the network at any time.

In many circumstances, select flows may be considered more important or to be of a higher priority than other flows. For instance, a flow containing voice over Internet Protocol (VoIP) data may be considered a relatively high priority flow, as any delay or interruption to such a flow may directly impact a user's experience (e.g., by interrupting the user's call). As such, a network device may treat such a flow as having a higher priority when allocating the network device's fixed resources amongst the flows. Additionally, some flows may be considered to be more time-sensitive than other network flows. For example, while all network flows may be considered to be of equal importance, certain network flows may not be delayable, while other flows may operate is a satisfactory manner even with delay.

Network devices within the network can use a Quality of Service (QoS) policy to manage such relative priorities between the flows. In addition to relative priorities between the flows, such a QoS policy can specify a number of other QoS metrics for each of the flows, e.g., minimum thresholds of acceptable performance for the respective flows, maximum network throughput allowed for each respective flow, and so on.

A number of different techniques may be used to assign priority levels and QoS requirements for each of the flows on a network device. For instance, a user (e.g., a network administrator) may manually create a QoS policy that identify flows according to properties of the flows (e.g., a specified port number, a particular Internet Protocol (IP) address, etc.) and may manually configure each network device accordingly. Another technique for determining flow information may involve deep packet inspection (DPI). As an example, for a particular flow, logic on the network device may be configured to examine the data portion within the packets of the particular flow, as well as header information within the packets, in order to determine information about the flow (e.g., a classification of the flow, such as gaming, VoIP, content streaming, etc.). The determined information may then be used for numerous flow management purposes, including prioritization, QoS requirements, security functions and so on.

There may be disadvantages to such DPI techniques. For instance, one disadvantage may be that such DPI techniques may be resource intensive, and may consume a significant portion of the network device's processing and memory resources. Additionally, such an inspection using DPI techniques may take a substantial amount of time to complete. This may be problematic when attempting to classify flows that only exist for a relatively short length of time. For example, if a flow ceases to exist before (or shortly after) it has been classified using the deep packet inspection techniques, the DPI analysis may provide no benefit to the network device, and the resources consumed by performing the DPI analysis may be wasted.

Additionally, the presence of encrypted traffic within data flows may be more prevalent. While DPI analysis techniques may help to classify flows by analyzing the content of individual packets within the flows, such techniques may not classify flows in which the content is encrypted, as the network devices may not have the requisite keys for decrypting the content. As such, it may be difficult to classify network connections using DPI techniques, as the prevalence of encrypted network traffic may continue to increase.

While Quality of Service (QoS) marking may be an important service for modern networks, as it may enable the prioritizing of key applications in congested environments, which types of network flows are important can vary greatly between environments. For example, data packets for a gaming application may be treated as low priority traffic in an enterprise environment, while data packets for the same gaming application may be seen as a standard or higher priority traffic in a university environment (e.g., where the gaming application is used as part of a class). QoS policy can also vary depending on the particular application corresponding to the network flow. For example, while gaming applications may generally be consider lower priority traffic in the university environment, a particular gaming application used as part of a class may be considered higher priority traffic.

While techniques exist to tune downstream QoS marking for each environment's specific requirements (e.g., based on Cisco® Application Visibility and Control (AVC) policies), these solutions may not control upstream QoS marking (e.g., from a wireless client to a wireless access point). For example, 802.11u may allow the infrastructure to send to the wireless client a Differentiated Services Code Point (DSCP) to User Priority (UP) map, but 802.11u may not include a mechanism to inform the station about a Layer 7 (application) to DSCP or UP mapping. While DSCP expresses L3 QoS marking, and UP L2 QoS marking in an 802.11 environment, both may express the relative importance of traffic (based on the DSCP or UP value in the respective frame or packet). However, because wireless access points may have no way to know what QoS marking may be appropriate for each environment and may be limited to using no QoS marking or a default marking (e.g., designed by the application or the operating system vendor), the wireless access points may be unable to apply an appropriate QoS policies for such traffic from their wireless clients. Moreover, this issue may be more difficult to solve in a Wi-Fi environment where the bottleneck may be in the wireless access point, unlike in a wired network where the first point of connection may implement traffic policies (e.g., in a wired environment, a station may have exclusive access to its link to the switch and thus congestion is usually not an issue on that segment).

As such, embodiments described herein may enable client devices on a particular network to perform QoS marking and prioritization that may be appropriate for the particular network. Because this marking information may be communicated to the client, the traffic may be marked at its origin, and the client device may use the information to internally prioritize the traffic in its own software queues. Consistent with embodiments of the disclosure, management frames may be used to provide the QoS policy (e.g., specifying application to DSCP and UP marking and/or bandwidth allocation instructions) to client devices on the network. For example, 802.11u may use Generic Advertisement Service (GAS) frames to exchange information between wireless client devices and wireless access points within the network. Embodiments describe herein may use such GAS frames to provide a network-specific QoS policy to wireless clients.

FIG. 1 shows an operating environment 100 consistent with embodiments of the disclosure for providing dynamic application QoS profile provisioning. As shown in FIG. 1, operating environment 100 may comprise a wireless client device 110 (e.g., a client device) and a wireless access point 130 (e.g., an access point). Wireless client device 110 may comprise an operating system 115 that may comprise a QoS policy component 120. Wireless access point 130 may comprise a QoS policy management component 140. Wireless client device 110 may comprise, but is not limited to, a tablet device, a mobile device, a smart phone, a telephone, a remote control device, a personal computer, a network computer, or other similar device capable of accessing and using a wireless local area network (WLAN) that may be accessed through wireless access point 130. Wireless access point 130 may comprise a networking hardware device that may allow a WLAN (e.g., Wi-Fi) compliant client device (e.g., wireless client device 110) to connect to a wired network. Wireless access point 130 may connect to a router (e.g., via a wired network) as a standalone device, but it may also be an integral component of the router itself.

An administrator of the network may configures a list of applications and their expected QoS treatment (e.g., L3 and or L2 marking, bandwidth, etc.). For instance, this configuration may be done through a deep packet inspection (DPI) mechanism. Each application on modern computing devices may correspond to a unique identifier (e.g., an application identifier). For example, on an Apple® iOS® device, such a unique identifier may be called a bundle-ID. As another example, on an Android™ device, this unique identifier may be called an Application Package ID. As yet another example, on a Microsoft® Windows® device, this unique identifier may be called an Application ID.

Each application-specific identifier may be unique and may stay the same as the application release version changes. In one embodiment, the infrastructure may maintain a mapping table listing the applications supported on the wireless infrastructure, along with their identifiers for the supported client STA OS vendors. In another embodiment, this mapping may be built dynamically when the administrator configures the network application QoS policy, by retrieving the application identifiers from the well-known application identifier repositories of the supported client STA OS vendors.

QoS policy management component 140 on wireless access point 130 may be configured to transmit an aggregated QoS policy to wireless client device 110, upon successful authentication and association of wireless client device 110 on the network. QoS policy management component 140 may be configured to transmit the aggregated QoS policy to wireless client device 110 at other times during the client session (or before association). For example, such an aggregated QoS policy may specify a listing of application identifiers and corresponding QoS information for each of the listed application identifiers. QoS policy component 120 on wireless client device 110, upon receiving the aggregated QoS policy, may implement the QoS policy for network flows created by applications on wireless client device 110. For example, for a given network flow, QoS policy component 120 may determine an application corresponding to the network flow and may determine QoS treatment for the network flow based on the received QoS policy. For instance, if the received QoS policy specifies QoS information for the determined application, QoS policy component 120 may apply the specified QoS information to the given network flow. As another example, if the received QoS policy does not specify any QoS information for the determined application, QoS policy component 120 may apply a default QoS treatment to the given network flow.

Figure 2:
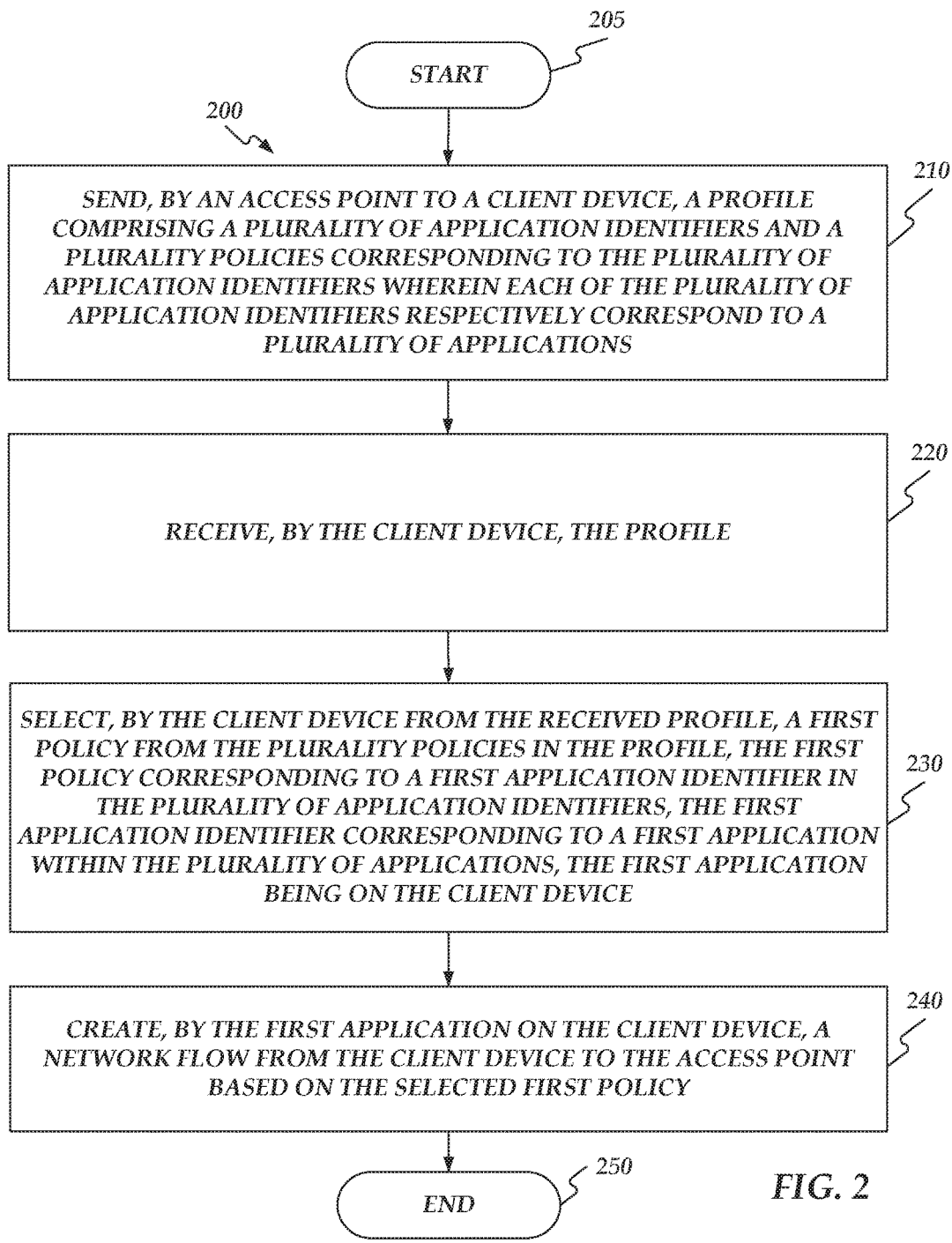
FIG. 2 shows a flow chart of a method for providing dynamic application QoS profile provisioning.

FIG. 2 is a flow chart setting forth the general stages involved in a method 200 consistent with an embodiment of the disclosure for providing dynamic application QoS profile provisioning. Method 200 may be implemented using wireless client device 110 and wireless access point 130 as described in more detail above with respect to FIG. 1 and below with respect to FIG. 3 and FIG. 4. Ways to implement the stages of method 200 will be described in greater detail below.

Method 200 may begin at starting block 205 and proceed to stage 210 where wireless access point 130 may send to wireless client device 110 a profile comprising a plurality of application identifiers and a plurality of policies corresponding to the plurality of application identifiers. Each of the plurality of application identifiers may respectively correspond to a plurality of applications. From stage 210, where wireless access point 130 sends the profile to wireless client device 110, method 200 may advance to stage 220 where wireless client device 110 may receive the profile.

Once wireless client device 110 receives the profile in stage 220, method 200 may continue to stage 230 where wireless client device 110 may select from the received profile, a first policy from the plurality policies in the profile. The first policy may correspond to a first application identifier in the plurality of application identifiers. The first application identifier may correspond to a first application within the plurality of applications. The first application may be running on wireless client device 110. For example, after wireless client device 110 associates with wireless access point 130 and has been successfully authenticated, QoS policy component 120 on wireless client device 110 may transmit a data packet(s) indicating support for dynamic application QoS profile provisioning (e.g., by requesting an application QoS profile for the network from wireless access point 130).

QoS policy management component 140 on wireless access point 130 may then send to wireless client device 110 a profile comprising, for example, a list of application identifiers and a QoS policy for at least one of the applications. Such a QoS policy may specify, for example, maximum/minimum upstream QoS markings for the respective application, the maximum bitrate at which the respective application is permitted to send traffic, a relative priority of the application, and so on. In one embodiment, the GAS initial request and response frames post-association may be used to exchange QoS parameters specific to wireless access point 130 and wireless client device 110. For instance, as per 802.11u, these frames may be robust management frames (and therefore encrypted). Embodiments of the disclosure may use 802.11u GAS frames to send a list of application identifiers and optionally their expected QoS treatment (e.g., marking, bandwidth, etc.).

In doing so, embodiments of the disclosure may add the application identifiers and some possible bandwidth parameters to the existing 802.11u frames. For example, QoS policy component 120 on wireless client device 110 may send an initial GAS request, where the advertisement protocol element contains a vendor specific ID (e.g., protocol-ID 221, as defined by IEEE 802.11u). Additionally, the query request field in the request may identify a request for the application-to-marking table from the wireless access point. QoS policy management component 140 on wireless access point 130, in response, may transmit a GAS response that may also contain a vendor-specific advertisement protocol element and contains identifiers of applications and corresponding QoS policy information as described herein. For example, the GAS response could specify respective QoS information (e.g., relative priority levels, minimum and/or maximum bandwidth levels, etc.) for select application identifiers and may further specify default QoS information to be applied to applications whose application identifiers may not be listed and to listed applications for which no QoS information is specified.

QoS policy management component 140 on wireless access point 130 may be configured to transmit a GAS response that contains a list of applications "of interest" (also referred to herein as a whitelist). Upon receiving the GAS response, QoS policy component 120 on wireless client device 110 may be configured to set the QoS marking for data packets generated by the whitelisted applications as determined by the application developer. QoS policy component 120 on wireless client device 110 may set QoS marking for other applications according to a QoS policy specific to the other application or according to a default policy (e.g., where data packets are sent with a lower priority relative to whitelisted applications).

The GAS response may contain the list of whitelisted applications, and also may specify more advanced instructions about the treatment of these applications. For example, QoS policy management component 140 on wireless access point 130 may transmit a GAS response specifying QoS values (e.g., marking, bandwidth, etc.) allowed for each whitelisted application, and/or maximum bandwidth allowed for the application. Information about applications that are not on the whitelist may also be transmitted (such as default marking or bandwidth for these applications). Additionally, the GAS response may specify detailed marking information for each type of flow that the application is likely to initiate. That is, a particular application may be capable of generating multiple distinct types of network flows, and the GAS response message may specify a respective QoS policy to apply to each distinct type of network flow generated by the particular application. For example, a communications application could be capable of generating text messaging flows, Voice over IP (VoIP) flows, video communication flows and file transfer flows, and wireless access point 130 could transmit a GAS response message specifying a respective QoS policy for each type of network flow for the particular communications application.

After wireless client device 110 selects from the received profile in stage 230, method 200 may proceed to stage 240 where the first application may create on wireless client device 110, a network flow from wireless client device 110 to wireless access point 130 based on the selected first policy. For example, for the network flow, QoS policy component 120 may have determined that the first application corresponds to the network flow and may determine QoS treatment for the network flow based on the received QoS policy corresponding to the first application. For instance, if the received QoS policy specifies QoS information for the first application, QoS policy component 120 may apply the specified QoS information to the network flow. Once the first application creates the network flow on wireless client device 110 in stage 240, method 200 may then end at stage 250.

In another embodiment, QoS policy component 120 may transmit, to QoS policy management component 140 on wireless access point 130, a message specifying an application ID when an application is opened on wireless client device 110. While examples are described herein using an application ID, more generally any technique for identifying an application can be used, consistent with embodiments of the disclosure. QoS policy management component 140 may then respond with the intended marking for the specified application (e.g., or a default behavior if the application is not known, or not configured as being "of interest" by the network policy).

Consistent with embodiments of the disclosure, QoS policy management component 140 may be configured to intercept DNS requests made when target applications are enabled on wireless client device 110. QoS policy management component 140 may then use DNS-AS to obtain information about the application and return the configured matching QoS policy. For example, QoS policy management component 140 may access a mapping of known network addresses to application IDs using the domain name specified in the DNS request, in order to determine an application ID corresponding to the application from which the DNS request originated. As another example, QoS policy management component 140 may intercept a DNS response message from a DNS server for the network that specifies an IP address corresponding to the domain name specified in the DNS request. QoS policy management component 140 may then access the mapping of known network addresses to application IDs using the IP address in order to determine the application ID corresponding to the application from which the DNS request originated. As another example, QoS policy management component 140 may use DNS-AS to obtain a general category to which the application belongs (e.g., a voice application, a video streaming application, etc.) and may determine a QoS policy corresponding to the general category.

While embodiments of the disclosure may be described as using 802.11u GAS frames, such examples are without limitation and may be provided as examples. More generally, other frames (e.g., vendor-specific options in association frames, other action frames, or even proprietary formatting of specific frames such as Management of subtypes 0111, or data frames) may be used to carry out processes consistent with embodiments of the disclosure.

Additionally, QoS policy component 120 on wireless client device 110 receiving the application identifiers and marking instructions may invoke a process to dynamically update each application socket marking configuration in the operating system (e.g., in RAM or non-volatile memory, if the process is intended to survive a reboot). Consistent with embodiments of the disclosure, the list of applications and marking instructions may be returned as a profile (e.g., Mobile Device Management (MDM) type profiles) and installed by wireless client device 110 as such. Wireless client operating system (OS) delivery mechanism can also take other forms (e.g., manual action from the user, accompanied with infrastructure parameters blocking traffic from the wireless access point until installation of the QoS map is detected, through proper upstream marking or other mechanism).

Upon disassociation from the network, QoS policy component 120 may be configured to empty the profile (e.g., re-establishing default marking conventions for data flows). When wireless client device 110 once again connects to a network, a QoS policy management component on a wireless access point for the network (e.g., the same network or a different network) can push a new profile as wireless client device 110 associates to the network, thereby re-establishing QoS mapping as defined by the network-specific profile. Doing so may enable wireless client device 110 to adapt its QoS behavior to the QoS configuration of the network it associates to.

Consistent with embodiments of the disclosure, QoS policy management component 140 may be configured to determine a QoS profile to send to wireless client device 110, based on an authenticated identity of wireless client device 110. For example, upon authenticating wireless client device 110, QoS policy management component 140 may select one of a plurality of distinct QoS profiles to transmit to wireless client device 110, based on the authenticated identity of wireless client device 110. As an example, upon determining that the authenticated identity belongs to a particular group of users, QoS policy management component 140 may select a QoS profile corresponding to the particular group of users. Doing so may enable QoS policy management component 140 to tailor the QoS policy to the specific user, which may improve the efficiency of the network environment. In other words, QoS policy management component 140 may account for different applications being of greater importance to some users by adapting the QoS policy for wireless client device 110 according to the authenticated identity.

Embodiments of the disclosure may allow wireless infrastructure administrators to know that upstream QoS behavior (i.e., from a client) may be the same as downstream QoS behavior (i.e., from a wireless infrastructure). Thus, QoS may become symmetrical (i.e., no unpredictable client upstream behavior or client upstream behavior that differs from the network downstream behavior). Moreover, embodiments of the disclosure may be implemented as using native calls in the client operating systems, thereby alleviating any need for proprietary software on the wireless client device 110. QoS instructions may contain application names, flows, DSCP values, UP values, bandwidth allocation, and is therefore applicable in the network stack, but also within the client operating system prioritization engine.

Figure 3:
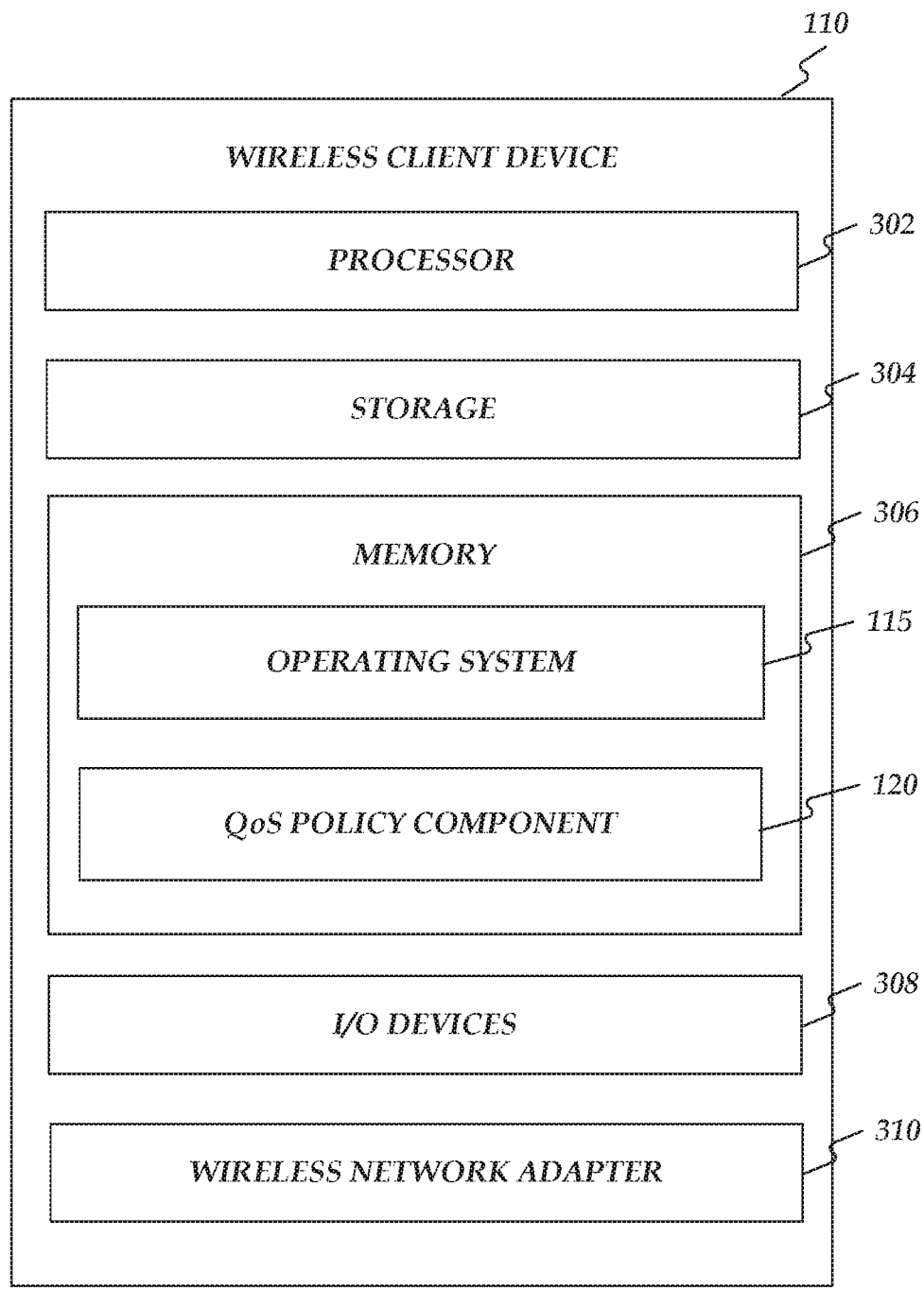
FIG. 3 is a block diagram showing a wireless client device.

FIG. 3 is a block diagram showing wireless client device 110 configured with a QoS policy component consistent with embodiments of the disclosure. Wireless client device 110 may perform processes for providing dynamic application QoS profile provisioning, including for example, any one or more of the stages from method 200 described above with respect to FIG. 2. As shown in FIG. 3, wireless client device 110 may comprise, without limitation, a processor 302, storage 304, memory 306, I/O devices 308, and a wireless network adapter 310. Processor 302 may retrieve and execute programming instructions stored in memory 306 (or in storage 304). Processor 302 may be representative of a single CPU, multiple CPUs, a single CPU having multiple processing cores, GPUs having multiple execution paths, and the like. Memory 306 may be representative of a random access memory. Wireless network adapter 310 may enable wireless network client 110 to connect to a wireless data communications network (e.g., an 802.11 wireless network). Embodiments of the disclosure may be implemented using any device or computer system capable of performing the described functions.

Memory 306 may represent any memory sufficiently large to hold the necessary programs and data structures. Memory 306 may be one or a combination of memory devices, including Random Access Memory, nonvolatile or backup memory (e.g., programmable or Flash memories, read-only memories, etc.). In addition, memory 306 and storage 304 may be considered to include memory physically located elsewhere; for example, on another computer communicatively coupled to wireless client device 110. Memory 306 may comprise an operating system 115, which in turn may comprise QoS policy component 120. Operating system 115 may control the execution of application programs on wireless client device 110. Examples of operating system 115 include UNIX, versions of the Microsoft Windows® operating system, distributions of the Linux® operating system, versions of Apple® iOS® and the like. Additional examples of operating system 115 may comprise custom operating systems for gaming consoles, including the custom operating systems for systems such as the Nintendo DS® and Sony PSP®.

I/O devices 308 may represent a wide variety of input and output devices, including displays, keyboards, touch screens, and so on. For instance, I/O devices 308 may comprise a display device used to provide a user interface. As an example, the display may provide a touch sensitive surface allowing the user to select different applications and options within an application (e.g., to select an instance of digital media content to view). Additionally, I/O devices 308 may comprise a set of buttons, switches or other physical device mechanisms for controlling wireless client device 110. For example, I/O devices 308 may include a set of directional buttons used to control aspects of a video game played using wireless client device 110.

QoS policy component 120 may be configured to receive a QoS policy from wireless access point 130, upon successfully authenticating with wireless access point 130. QoS policy component 120 may be configured to manage wireless network traffic for the wireless client device 110 according to the received QoS policy. For example, the QoS policy may specify that a particular application (i.e., an application identified using a unique application identifier corresponding to the application) is of higher relative priority than other applications on wireless client device 110. As such, QoS policy component 120 may prioritize data packets for data flows created by the particular application, over data packets for data flows created by other applications on wireless client device 110. In doing so, QoS policy component 120 may delay or even potentially drop data packets generated by the data flows for the other applications on wireless client device 110, as needed to ensure priority is given to the data packets for the particular application.

Figure 4:
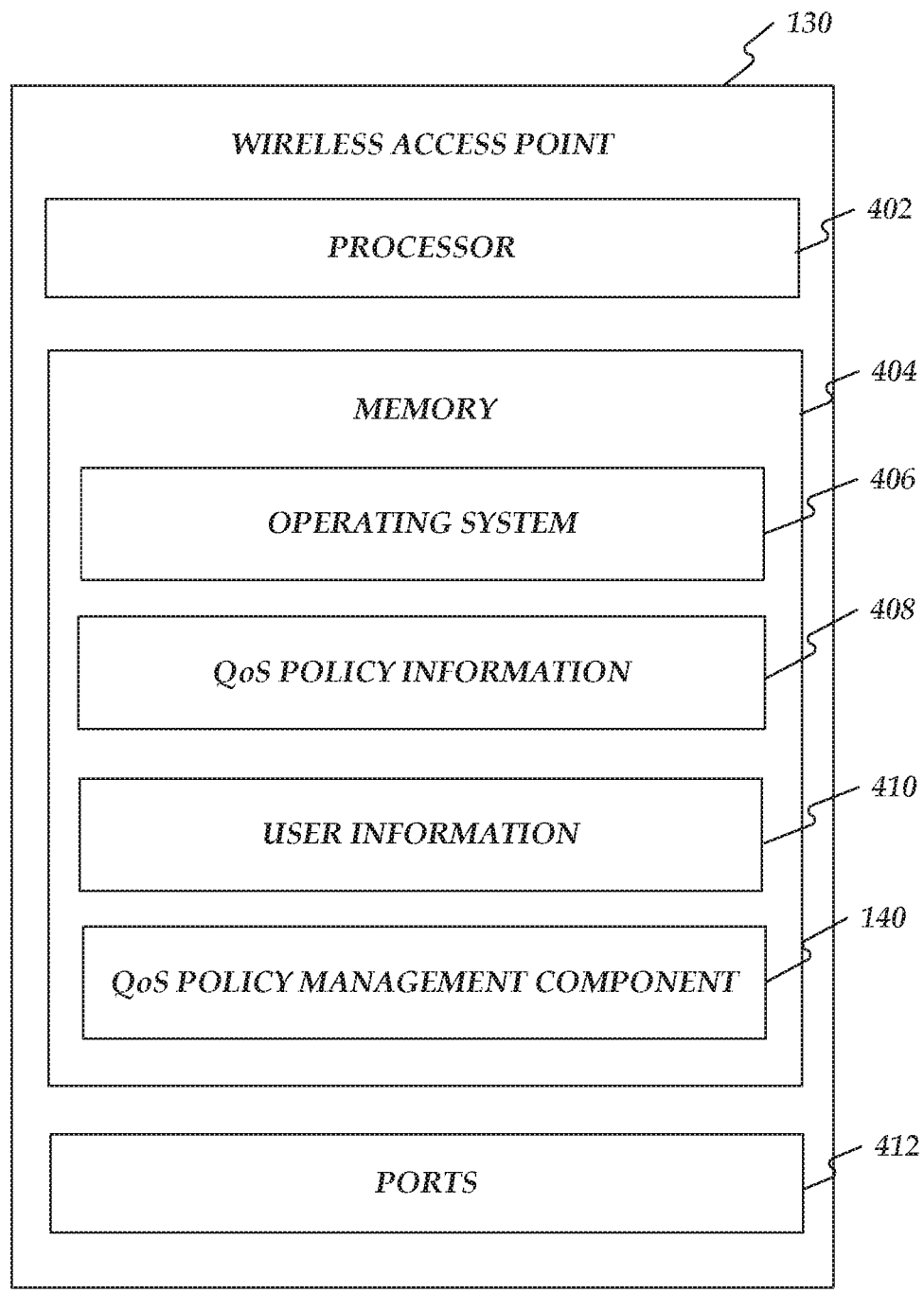
FIG. 4 is a block diagram showing a wireless access point.

FIG. 4 is a block diagram showing wireless access point 130 configured with QoS policy management component 140 consistent with embodiments of the disclosure. Wireless access point 130 may perform processes for providing dynamic application QoS profile provisioning, including for example, any one or more of the stages from method 200 described above with respect to FIG. 2. As show in FIG. 4, wireless access point 130 may comprise a processor 402, a memory 404, and a plurality of ports 412. Processor 402 may be any processing element capable of performing the functions described herein, and such a processor can represent a single processor, multiple processors, a processor with multiple cores, and combinations thereof.

Memory 404 may, comprise, but is not limited to, either volatile or non-volatile memory and include, RAM, flash, cache, disk drives and the like. Although shown as a single entity, the memory 404 may be divided into different memory storage elements such as RAM and one or more hard disk drives. In one embodiment, memory 404 may comprise one or more static random access memory (SRAM) modules. As shown in FIG. 4, memory 404 may comprise an operating system 406, QoS policy information 408, user information 410, and QoS policy management component 140. Operating system 406 may control the execution of application programs on wireless access point 130. Examples of operating system 406 may comprise, but are not limited to, versions of Cisco® IOS®, Cisco® Catalyst OS, UNIX and distributions of the Linux® operating system.

QoS policy management component 140 may be configured to transmit a QoS policy to authenticated wireless client devices. For example, QoS policy management component 140 may authenticate a wireless client device (e.g., wireless client device 110) based on credentials information (e.g., login and password information, a security credential, etc.) received from the wireless client device and based on the authenticated identity of the wireless client device, QoS policy management component 140 may determine a QoS policy to be used by the wireless client device. QoS policy management component 140 may then transmit the determined QoS policy to the wireless client device. QoS policy management component 140 may be configured to provide the same QoS policy for all wireless client devices on the network. QoS policy management component 140 may be configured to select one of a plurality of QoS policies to be used by the wireless client device, based on the authenticated identity of the wireless client device and/or the wireless client device user. For example, QoS policy management component 140 may select the QoS policy based not only on a device type of the wireless client device (e.g., a particular model of smartphone), but also based on an identity of the user of the wireless client device.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, from an access point at a client device, a profile comprising a plurality of application identifiers and a plurality policies corresponding to the plurality of application identifiers, wherein each of the plurality of application identifiers respectively correspond to a plurality of applications;
selecting, by the client device from the received profile, a first policy from the plurality policies in the profile for a first upstream network flow originating from a first application of the client device, the first policy corresponding to a first application identifier in the plurality of application identifiers, the first application identifier corresponding to the first application within the plurality of applications, the first application being on the client device, wherein the first policy indicates a maximum and a minimum upstream quality of service (QoS) markings for the first application, and wherein the first policy further indicates a respective QoS marking for each of a plurality of network flows for the first application;
selecting, by the client device, a default policy for a second upstream network flow originating from a second application of the client device, wherein selecting the default policy comprises selecting the default policy in response to a second application identifier corresponding to the second application not being listed in the received profile;
applying, by the client device, the first policy to the first upstream network flow and the default policy to the second upstream network flow;
creating, by the first application on the client device, the first upstream network flow from the client device to the access point based on the selected first policy; and
creating, by the second application on the client device, the second upstream network flow based on the default policy.

2. The method of claim 1, further comprising associating, by the client device, with the access point.

3. The method of claim 2, wherein receiving the profile comprises receiving the profile in response to associating, by the client device, with the access point.

4. The method of claim 2, wherein receiving the profile comprises receiving the profile prior to associating, by the client device, with the access point.

5. The method of claim 1, wherein selecting the first policy comprises selecting the first policy wherein the first policy indicates a maximum bitrate at which the application is permitted to send the network flow.

6. The method of claim 1, wherein receiving the profile comprises receiving the profile using a Generic Advertisement Service (GAS) frames to exchange information between the access point and the client device.

7. The method of claim 1, wherein selecting the default policy comprises selecting the default policy in response no policy being listed for the second application in the received profile.

8. The method of claim 1, further comprising:
blocking network flows from the client device until the client device receiving the profile.

9. The method of claim 1, further comprising:
removing received profile from the client device in response to disassociation of the client device from the access point; and
applying, in response to the disassociation, a pre-association default policy to network flows from the client device.

10. A method comprising:
sending, by a client device to an access point, information identifying a first application to be used by the client device;
receiving, by the access point the information identifying the first application to be used by the client device;
obtaining, by the access point in response to receiving the information identifying the first application to be used by the client device, a first policy corresponding to the first application, wherein the first policy indicates a maximum and a minimum upstream quality of service (QoS) markings for the first application, and wherein the first policy further indicates a respective QoS marking for each of a plurality of network flows for the first application;
selecting, by the client device, a default policy for a second application, wherein selecting the default policy comprises selecting the default policy in response to a second application identifier corresponding to the second application not being listed in the received profile;
sending, by the access point to the client device in response to the access point obtaining the first policy corresponding to the application, the first policy;
receiving, by the client device, the first policy and the default policy;
applying, by the client device, the first policy and the default policy to the first upstream network flow and the second upstream network flow respectively; and
creating, by the application on the client device, the first upstream network flow and the second upstream network flow from the client device to the access point based on the first policy and the default policy.

11. The method of claim 10, wherein sending the information identifying the application to be used by the client device comprises sending the information comprising an application identifier.

12. The method of claim 10, wherein sending the information identifying the application to be used by the client device comprises sending the information comprising information corresponding to a Domain Name System (DNS) requests made when the application is enabled on the client device.

13. The method of claim 10, wherein sending the information identifying the application to be used by the client device comprises sending the information comprising information corresponding to a Domain Name System (DNS) request made when the application is enabled on the client device wherein the DNS request indicates a category to which the application belongs.

14. The method of claim 10, wherein sending the policy comprises sending the policy wherein the policy indicates a maximum bitrate at which the application is permitted to send the network flow.

15. The method of claim 10, wherein sending the policy comprises sending the policy using a Generic Advertisement Service (GAS) frames to exchange information between the access point and the client device.

16. A system comprising:
a memory storage; and
a processing unit coupled to the memory storage, wherein the processing unit is operative to:

receive a profile comprising a plurality of application identifiers and a plurality policies corresponding to the plurality of application identifiers wherein each of the plurality of application identifiers respectively correspond to a plurality of applications;

select a first policy from the plurality policies in the profile for a first upstream network flow originating from a first application of the client device, the first policy corresponding to a first application identifier in the plurality of application identifiers, the first application identifier corresponding to the first application, wherein the first policy indicates a maximum and a minimum upstream quality of service (QoS) markings for the first application, and wherein the first policy further indicates a respective QoS marking for each of a plurality of network flow for the first application;

select a default policy for a second upstream network flow originating from a second application of the client device, the default policy being selected in response to a second application identifier corresponding to the second application not being listed in the received profile;

apply the first policy to the first upstream network flow and the default policy to the second upstream network flow;

create, by the first application, the first upstream network flow based on the first policy; and create, by the second application, a second upstream network flow based on the default policy.

17. The system of claim 16, wherein the processing unit being operative to select the first policy comprises the processing unit being operative to select the first policy wherein the first policy indicates a maximum bitrate at which the first application is permitted to send the network flow.

18. The system of claim 16, wherein the processing unit being operative to receive the profile comprises the processing unit being operative to receive the profile using a Generic Advertisement Service (GAS) frames to exchange information.

19. The system of claim 16, wherein the processing unit is further operative to associate with an access point.

20. The system of claim 19, wherein the processing unit being operative to receive the profile comprises the processing unit being operative to receive the profile in response to the processing unit associating with the access point.

\* \* \* \* \*